US010416916B2

(12) United States Patent
Roozbeh et al.

(10) Patent No.: US 10,416,916 B2
(45) Date of Patent: Sep. 17, 2019

(54) METHOD AND MEMORY MERGING FUNCTION FOR MERGING MEMORY PAGES (71) Applicant: Telefonaktiebolaget LM Ericsson (publ), Stockholm (SE)

(72) Inventors: Amir Roozbeh, Kista (SE); Joao Monteiro Soares, Solna (SE); Daniel Turull, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,725

(22) PCT Filed: Oct. 19, 2015

(86) PCT No.: PCT/EP2015/074129
§ 371 (c)(1),
(2) Date: Apr. 19, 2018

(87) PCT Pub. No.: WO2017/067569
PCT Pub. Date: Apr. 27, 2017

(65) Prior Publication Data
US 2018/0314453 A1    Nov. 1, 2018

(51) Int. Cl.
*G06F 3/06* (2006.01)
*G06F 12/10* (2016.01)
*G06F 12/02* (2006.01)

(52) U.S. Cl.
CPC ............ *G06F 3/0641* (2013.01); *G06F 3/067* (2013.01); *G06F 3/0608* (2013.01);
(Continued)

(58) Field of Classification Search
CPC .... G06F 3/0641; G06F 3/0608; G06F 3/0611; G06F 3/067; G06F 12/10; G06F 12/0253;
(Continued)

(56) References Cited

U.S. PATENT DOCUMENTS 6,789,156 B1   9/2004   Waldspurger
8,935,506 B1   1/2015   Gopalan
(Continued)

OTHER PUBLICATIONS

International Search Report and Written Opinion for International Application No. PCT/EP2015/074129, dated Oct. 14, 2016, 8 pages.
(Continued)

*Primary Examiner* — Hiep T Nguyen
(74) *Attorney, Agent, or Firm* — NDWE LLP (57) ABSTRACT A Memory Merging Function "MMF" for merging memory pages. A hardware system comprises a set of memory blades and a set of computing pools. At least one instance of an operating system executes on the hardware system. The MMF is independent of the operating system. The MMF finds a first and a second memory page. The first and second memory pages include identical information. The first and second memory pages are associated with at least one computing unit of the computing units. The MMF obtains a respective memory blade parameter relating to memory blade of the first and second memory pages and a respective latency parameter relating to latency for accessing the first and second memory pages. The MMF releases at least one of the first and second memory pages based on the respective memory blade and latency parameters.

24 Claims, 7 Drawing Sheets (52) U.S. Cl.
CPC ........ G06F 3/0611 (2013.01); G06F 12/0253 (2013.01); G06F 12/10 (2013.01); *G06F 2212/1024* (2013.01); *G06F 2212/1044* (2013.01); *G06F 2212/154* (2013.01); *G06F 2212/656* (2013.01); *G06F 2212/657* (2013.01)

(58) Field of Classification Search
CPC ....... G06F 2212/1044; G06F 2212/656; G06F 2212/657; G06F 2212/1024; G06F 2212/154
See application file for complete search history.

(56) References Cited

U.S. PATENT DOCUMENTS

| | | | | |
|---|---|---|---|---|
| 9,983,827 | B1* | 5/2018 | Tsirkin | ................ G06F 12/1009 |
| 2010/0223432 | A1* | 9/2010 | Eidus | .................... G06F 12/109 |
| | | | | 711/148 |
| 2013/0036249 | A1* | 2/2013 | Angaluri | ............. G06F 9/45558 |
| | | | | 711/6 |
| 2013/0159596 | A1* | 6/2013 | Van De Ven | ......... G06F 12/109 |
| | | | | 711/6 |
| 2015/0286414 | A1 | 10/2015 | Gordon et al. | |
| 2016/0291998 | A1* | 10/2016 | Dong | .................... G06F 3/0604 |
| 2016/0350261 | A1* | 12/2016 | Tsirkin | ................ G06F 12/0292 |
| 2017/0147224 | A1* | 5/2017 | Kumar | ................ G06F 16/1748 |
| 2017/0364263 | A1* | 12/2017 | Lublin | .................... G06F 3/061 |

OTHER PUBLICATIONS

"Kernel same-page merging (KSM)," 2 pages, downloaded from http://www-01.ibm.com/support/knowledgecenter/api/content/... on Feb. 6, 2015.

Andrea Arcangeli et al., "Increasing memory density by using KSM," Jul. 13-17, 2009, 12 pages, Proceedings of the Linux Symposium, Montreal, Quebec, Canada.

* cited by examiner

METHOD AND MEMORY MERGING FUNCTION FOR MERGING MEMORY PAGES

CROSS-REFERENCE TO RELATED APPLICATIONS

This application is a National stage of International Application No. PCT/EP2015/074129, filed Oct. 19, 2015, which is hereby incorporated by reference.

TECHNICAL FIELD

Embodiments herein relate to computer systems, such as data center systems. In particular, a method and a Memory Merging Function for merging memory pages are disclosed. A corresponding computer program and a carrier therefor are also disclosed.

BACKGROUND

A computer system manages multiple resources, such as computing power, network access and memory storage. The multiple resources are of course not infinitive. In particular, the memory storage is in many cases a limiting resource in view of the computer systems capacity and/or performance. As an example, program code for handling e.g. user-interface objects, common mathematical functions and search queries is identical for many different applications. Therefore, it has become customary to share memory of the computer system between different applications.

A Personal Computer (PC), as an example of a known computer system with memory sharing, comprises at least one Central Processing Unit (CPU) as computing power. Moreover, the PC comprises memory; primary and secondary memories. Primary memory is normally fast random access memories of different types. Secondary memory, such as a Hard Disc Drive (HDD) or Solid State Disc drive (SSD) is slower than primary memory. A smallest addressable section of the memory is referred to as a page, or memory pages. The PC is installed with Linux as Operating System (OS). Within the Linux operating system a function called Kernel Same-page Merging (KSM) is implemented in order to provide memory sharing. With KSM, the operating system scans the memory to find identical memory pages. When two or more identical memory pages are found, these are marked as sharable. Identification of identical memory pages may be performed in various known manners, such as search based on hash-tables, red-black tree or the like. Upon processing the sharable memory pages, the KSM function replaces the sharable memory pages with one shared memory page that is write-protected. This means that none of the applications that use the shared memory page is allowed, as monitored by the KSM function, to modify the contents of the shared memory page. Should one of the applications need to modify the content of the shared memory page, a copy of the shared memory page will be created and any modifications will be performed on the copy just created. Copying and modifying memories pages in this manner is often referred to as that the shared memory page is protected with copy-on-write.

While the above mentioned KSM function is suitable for traditional hardware architectures, it is sub-optimal for the data center hardware architectures that are arising, e.g. disaggregated hardware type of architectures, such as the Intel Rack Scale architecture, HyperScale Datacenter Systems or the like. By combining the disaggregated hardware architecture with optical interconnect, traditional distance and capacity limitations of electrical connections are alleviated. This enables a more efficient pooling of resources, which is expected to have a positive impact on utilization and energy consumption. A disaggregated hardware system of this kind, thus, typically comprises multiple pools of computing resources, multiple pools of memory resources etc.

The disaggregated hardware system is intended replace one or more PCs or servers, aka server machines. Consequently, for each server machine, a virtual hardware assembly is created by allocating a selected set of resources from the pools of resources in the disaggregated hardware system. The PC's operating system, such as Linux mentioned above, is then executed on the virtual hardware assembly. Even though the existing KSM function works well on such virtual hardware assembly, it is clear that unnecessary multiplicity of memory consumption for the KSM function may occur when multiple virtual hardware assemblies executes respective operating systems e.g. with the KSM function. In other cases, similar but not identical memory merging functions may be provided by respective operating systems executed on a plurality of virtual hardware assemblies. This also leads to unnecessary memory consumption since similar functionality is provided by the respective operating systems. A problem may thus be how to adapt memory merging to the disaggregated hardware system of the above mentioned kind.

SUMMARY

An object may be to provide an improved memory merging function that is adapted to a hardware system of the above mentioned kind, such as a disaggregated hardware system.

According to an aspect, the object is achieved by a method, performed by a Memory Merging Function, for merging memory pages, wherein the memory pages are comprised in a set of memory blades. A hardware system comprises the set of memory blades and a set of computing pools. The set of memory blades and the set of computing pools are interconnected with each other. The set of computing pools comprises computing units. At least one instance of an operating system executes on the hardware system. The Memory Merging Function is independent of the operating system. The Memory Merging Function finds, among the memory pages, a first and a second memory page, wherein the first and second memory pages include an identical information, wherein the first and second memory pages are associated with at least one computing unit of the computing units. The Memory Merging Function obtains a respective memory blade parameter relating to memory blade of the first and second memory pages. Moreover, the Memory Merging Function obtains a respective latency parameter relating to latency for accessing, by the at least one computing unit, the first and second memory pages. Furthermore, the Memory Merging Function releases at least one of the first and second memory pages based on the respective memory blade parameter of the first and second memory pages and the respective latency parameter of the first and second memory pages.

According to another aspect, the object is achieved by a Memory Merging Function for merging memory pages. The memory pages are comprised in a set of memory blades. A hardware system comprises the set of memory blades and a set of computing pools. The set of memory blades and the set of computing pools are interconnected with each other. The set of computing pools comprises computing units. At least one instance of an operating system executes on the hardware system. The Memory Merging Function is independent of the operating system. The Memory Merging Function is configured for finding, among the memory pages, a first and a second memory page, wherein the first and second memory pages include an identical information, wherein the first and second memory pages are associated with at least one computing unit of the computing units. The Memory Merging Function is configured for obtaining a respective memory blade parameter relating to memory blade of the first and second memory pages. Moreover, the Memory Merging Function is configured for obtaining a respective latency parameter relating to latency for accessing, by the at least one computing unit, the first and second memory pages. Furthermore, the Memory Merging Function is configured for releasing at least one of the first and second memory pages based on the respective memory blade parameter of the first and second memory pages and the respective latency parameter of the first and second memory pages.

According to further aspects, the object is achieved by computer programs and carriers therefor corresponding to the aspects above.

Thanks to that the Memory Merging Function (MMF) releases at least one of the first and second memory pages based on both the respective memory blade parameter of the first and second memory pages and the respective latency parameter of the first and second memory pages, the MMF considers the respective latency parameter in combination with the respective memory blade parameter. The memory blade parameter is unique for this kind of hardware system, e.g. a disaggregated hardware system. Thus, the MMF is able to determine which memory page of the first and second memory pages to release in order to more efficiently use the set of memory blades. Moreover, while the MMF is not part of the operating system, i.e. the MFF is independent of the operating system, overall system complexity is reduced. A reason for this is that the MMF may be invoked by one or more operating systems, which one or more operating systems may be less complex, i.e. without any memory merging functionality. Therefore, the above mentioned object is achieved.

As mentioned, an advantage is that the MMF is agnostic to the operating system, such as an operating system executed on a virtual hardware assembly or hypervisor.

Furthermore, the MMF advantageously improves memory handling across multiple virtual hardware assemblies of a disaggregated hardware system of the above mentioned kind, e.g. an architecture like Intel Rack Scale architecture, HyperScale Datacenter system or the like.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 1:
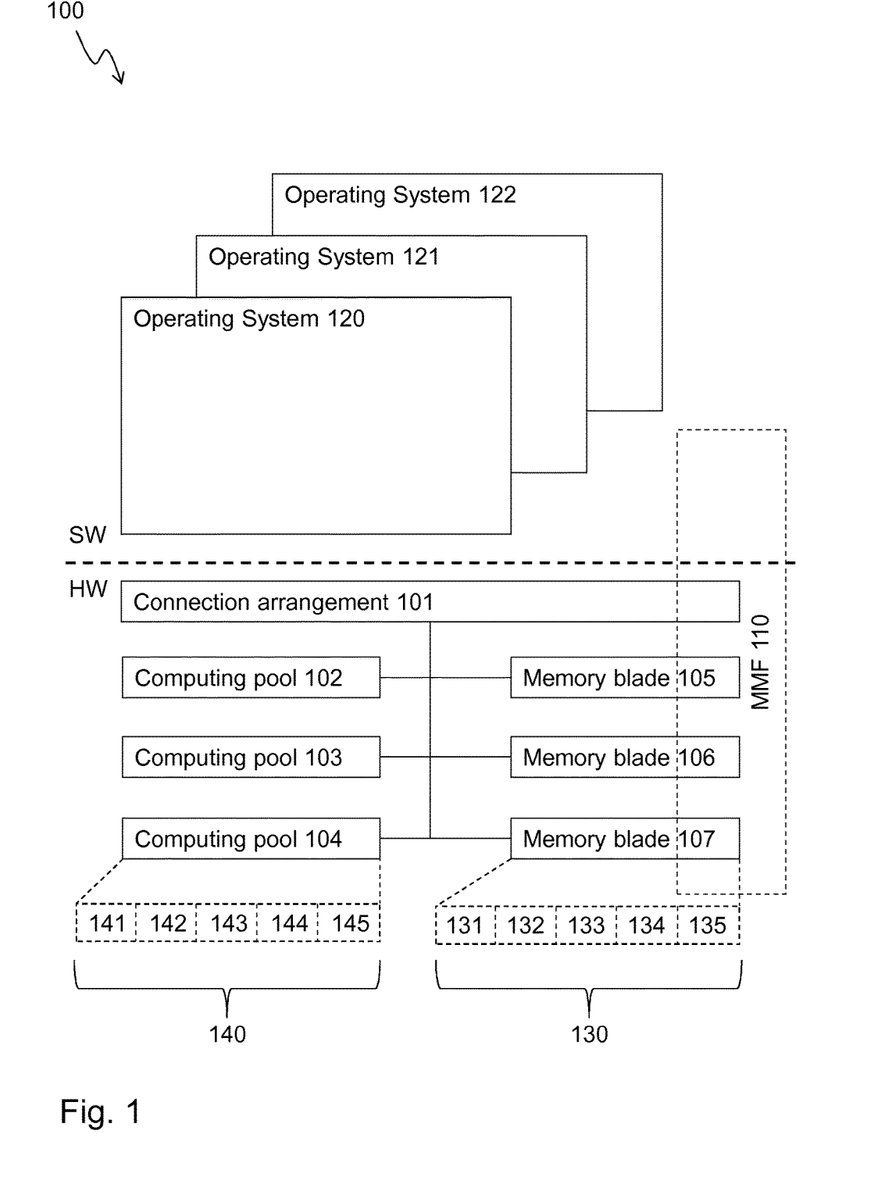
FIG. 1 is a schematic overview of an exemplifying computer system in which embodiments herein may be implemented.

FIG. 1 depicts an exemplifying computer system 100 in which embodiments herein may be implemented. The computer system 100 may be a hardware system, e.g. a disaggregated hardware system as disclosed in the background section.

Generally, the computer system 100 relies on a principle of hardware resource disaggregation. The principle of hardware disaggregation considers CPU, memory and network resources as individual and modular components. The resources are often organized in pools, i.e. there is a pool of CPU units, a pool of memory units, and a pool of network interfaces. When utilizing the computer system, a virtual hardware machine may be composed of a sub-set of units/resources within one or more pools.

In more detail, the disaggregated hardware system 100 may comprise a connection arrangement 101 for interconnecting a set of computing pools 102, 103, 104 with a set of memory blades 105, 106, 107. The connection arrangement 101 may be realized by optical fibers. Thus, providing a fast interconnection between the sets of computing pools and memory blades 102-107. Each memory blade of the set of memory blades 105, 106, 107 may be comprised in a rack of memory blades or the like. Sometimes, the term "sled" is used in instead of "blade".

Moreover, the set of memory blades 105, 106, 107 may comprise one or more of:

a set of primary storage pools for use by the set of computing pools, a set of cache memory blades for use by the set of computing pools, a set of storage pools, and the like.

Primary storage may be realized in the form of so called cache memory. The storage pools may include hard disc drives of various kinds, such as Solid State Drives, magnetic tape, conventional drives of various form factors (inches) and interfaces, such as Small Computer System Interface (SCSI), Integrated Drive Electronics (IDE/ATA), Serial ATA (SATA), etc.

Each computing pool comprises a set of computing units 141, 142, 143, 144, 145. The sets of computing pools 102, 103, 104 may be realized in the form of one or more sleds, blades or assemblies of one or more computer racks (not shown). The sets of computing units 141, 142, 143, 144, 145 may comprise CPUs, hardware implemented computing functions, etc. In some examples, each computing pool 102, 103, 104 lacks a so called L3 cache, which is co-located i.e. placed on a Printed Circuit Board (PCB) together with the CPU(s) in a conventional computer system.

Each memory blade comprises a set of memory units 131, 132, 133, 134, 135. The sets of memory blades 105, 106, 107 may be realized in the form of one or more sleds, blades or assemblies of one or more computer racks, the same, different or partially the same one(s) as compared the above mentioned racks for the computing pools. In some examples, each memory blade lacks any substantial processing capabilities. Such substantial processing capabilities, or computing resources, is thus provided by means of the sets of computing pools 102, 103, 104.

In more detail, the memory units may be arranged on a memory board, as an example of memory blade, and the computing units 140 are arranged on a computing board, as an example of computing pool/blade. The memory board is different from the computing blade. This may mean that the memory blade is a Printed Circuit Board (PCB) that is separate from a further PCB at which the computing units may be mounted.

The memory board and the computing board are connected to the connection arrangement 101 to interconnect the set of memory blades 105, 106, 107 and the set of computing pools 102, 103, 104. The set of memory blades 105, 106, 107 are mountable, such as installable, in a first plurality of cabinets, while still being connected to the connection arrangement. The set of computing pools 102, 103, 104 are mountable in a second plurality of cabinets, wherein some, none or all of the cabinets of the first and second plurality of cabinets are different from each other. This means that in one exemplifying realization, there is provided at least one memory cabinet, comprising memory blades, and at least one computing cabinet, comprising computing pools. In another realization, there may be one or more cabinets, wherein at least some of said one or more cabinets comprises both memory blades and computing pools, and/or wherein at least some of said one or more cabinets comprises either memory blades or computing pools.

At the software side (SW), as opposed to the hardware (HW) side above, one or more operating systems 120, 121, 122 may be executed on a respective virtual hardware machine. It shall here be said that a line between HW and SW is often somewhat fuzzy, since various programming languages enables implementation both as hardware and software, also a Field Programmable Gate Array (FPGA) can be seen as a half-SW and half-HW component. As indicated above, the respective virtual hardware machine may comprise a selected set of computing pools and a selected set of memory blades. The operating systems 120, 121, 122 may be referred to as virtual hosts, instances or the like, when executed by the computer system 100. Each operating system 120, 121, 122 may in its turn manage one or more instances of a software application, a virtual machine, database, a software library or the like. Accordingly, as used herein, the term "instance" may refer to an instance of a virtual host, a software application, virtual machine, database, a software library or the like.

Now, in order to provide the memory merging that is adapted to the computer system 100, a Memory Merging Function (MMF) 110 is provided. The MMF 110 may be implemented in SW, HW or partially HW and partially SW. Moreover, the MMF 110 may be co-located with one or more of the memory blades 105, 106, 107 and/or the connection arrangement 101. The MMF 110 may also be separate, e.g. located on a PCB that is separate from, the connection arrangement 101 and/or said one or more memory blades 105, 106, 107.

Figure 2:
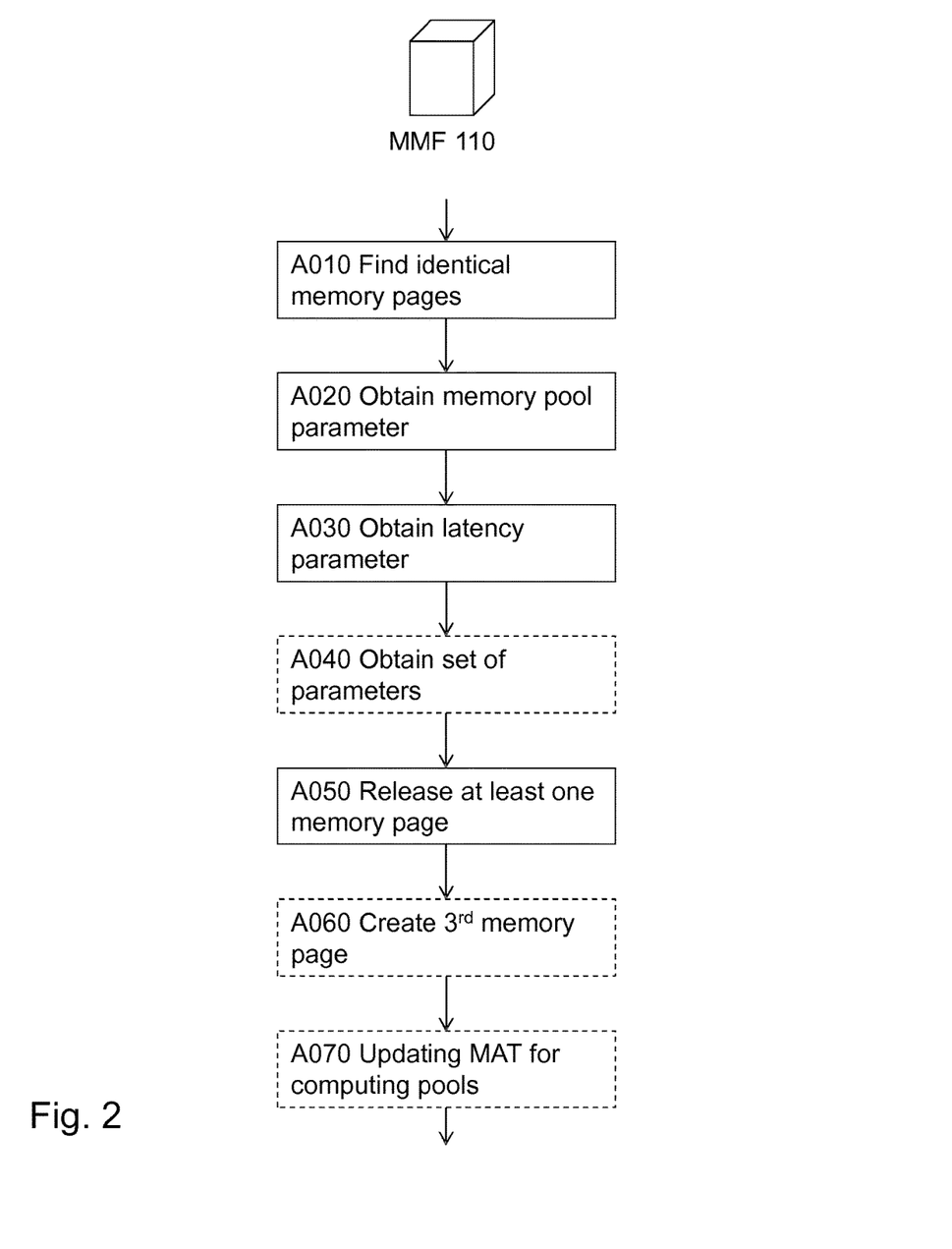
FIG. 2 is a flowchart illustrating embodiments of the method in the Memory Merging Function.

FIG. 2 illustrates an exemplifying method according to embodiments herein when implemented in the computer system 100 of FIG. 1. Hence, the MFF 110 performs a method for merging memory pages 130.

As indicated above, the memory pages are comprised in the set of memory blades 105, 106, 107. A hardware system 100 comprises the set of memory blades 105, 106, 107 and the set of computing pools 102, 103, 104. The set of memory blades 105, 106, 107 and the set of computing pools 102, 103, 104 are interconnected with each other. The set of computing pools 102, 103, 104 comprises computing units 140. At least one instance of an operating system 120 executes on the hardware system 100. The MMF 110 is independent of the operating system 120.

As an example, an Equipment Managing Function (EMF) (not shown) may manage equipment of the hardware system. In this example, the equipment may be the set of computing pools 102, 103, 104 and the set of memory blades 105, 106, 107. The EMF may assemble, e.g. upon request or automatically, a virtual hardware assembly to host an operating system 120, 121, 122, i.e. the operating system 120, 121, 122 executes on the virtual hardware assembly, aka virtual host. The EMF may be implemented in hardware, software or a combination thereof. In some examples, the EMF includes the MMF 110, or portions thereof. In some other examples, the MMF 110 is separate from the EMF. However, the MMF 110 may preferably be adapted to the EMF in order to provide the benefits disclosed herein.

One or more of the following actions may be performed in any suitable order.

Action A010

The MMF 110 finds, among the memory pages, a first and a second memory page 131, 132. The first and second memory pages 131, 132 include an identical information, i.e. an identical piece of information.

The first and second memory pages are associated with at least one computing unit 140 of the computing units 140. In some examples, the first and second memory pages are associated with the same computing unit, which may happen when only one instance of the operating system 120, 121, 122 is executing on one virtual hardware assembly. However, over time the computing units of said one virtual hardware assembly may vary, e.g. in terms of number of computing units, which computing units that are assigned to the virtual hardware assembly. As is illustrated below in FIG. 5, the identical memory pages 131, 132 may be identified between hosts, virtual machines, applications etc.

Action A020

The MMF 110 obtains a respective memory blade parameter relating to memory blade of the first and second memory pages 131, 132. The memory blade parameter may provide information about a physical structure of the hardware system 100. The memory blade parameter is to be used in action A050 below. This means that the memory blade parameter may relate to a physical location within the hardware system 100, which physical location may be given as an identity of the memory blade, or the set of memory blades.

As an example, the MMF 110 obtains the respective memory blade parameter by retrieving it from a memory of the MMF 110.

As another example, the MMF 110 obtains the respective memory blade parameter by receiving it, upon request or without request, from the EMF.

Action A030

The MMF 110 obtains a respective latency parameter relating to latency for accessing, by the at least one computing unit 140, the first and second memory pages 131, 132.

When the first and second memory pages 131, 132 are stored on the same memory blade, the respective latency parameters are typically equal. However, this may also happen when respective times for accessing and transferring information from two different memory blades are equal. Typically, however, the respective latency parameters are different from each other, when the first and second memory pages 131, 132 are stored on two different memory blades.

Action A040

The MMF 110 may obtain a respective set of parameters relating to the first and second memory pages 131, 132, wherein the respective set of parameters comprises one or more of:
- a respective access rate parameter relating to access rate to the first and second memory pages 131, 132 from said at least one computing unit,
- a respective redundancy parameter,
- a respective type of memory capability parameter,
- a respective bus-load parameter, and the like.

Expressed differently, the releasing A050 of said at least one of first and second memory pages 131, 132 further is based on the set of parameters.

As an example, the MMF 110 may release said at least one of the first and second memory pages 131, 132 by releasing only the first memory page. This may be beneficial when the respective bus-load parameter of the first memory page 131 may indicate less bus-load than the respective bus-load parameter of the second memory page 132.

Expressed differently, the releasing A050 of said at least one of the first and second memory pages 131, 132 may comprise releasing the first memory page, wherein the respective bus-load parameter of the first memory page 131 may indicate less bus-load than the respective bus-load parameter of the second memory page 132.

In a further example, the respective bus-load parameter may be indicated by a number of hops between the at least one computing unit 140 and the first and second memory pages 131, 132. The term "hops" refers to number of physical links between the at least one computing unit 140 and the first and second memory pages 131, 132. Another way of expressing the hops may be to refer to bandwidth between the at least one computing unit 140 and the first and second memory pages 131, 132. The bus-load parameter may be particularly beneficial to consider when the respective latency parameters for the first and second memory pages 131, 132 are equal.

Action A050

The MMF 110 releases at least one of the first and second memory pages 131, 132 based on the respective memory blade parameter of the first and second memory pages 131, 132 and the respective latency parameter of the first and second memory pages 131, 132.

In more detail, the MMF 110 may determine to release the first memory page 131 and/or the second memory page 132 based on the respective memory blade and latency parameters.

In one example, when the first and second memory pages 131, 132 are stored on different memory blades, the respective memory blade parameter of the first memory page 131 may be different from the respective memory blade parameter of the second memory page 132. The MMF 110 may then release the first memory page 131, when the respective latency parameter of the first memory page 131 is less than the respective latency parameter of the second memory page 132.

Expressed differently, the releasing A050 may comprise releasing the first memory page 131, wherein the respective latency parameter of the first memory page 131 is less than the respective latency parameter of the second memory page 132.

In a further example, when the first and second memory pages 131, 132 are stored on the same memory blade, the respective memory blade parameter of the first memory page 131 may be equal to the respective memory blade parameter of the second memory page 132. The MMF 110 may then release the first and second memory pages 131, 132. Expressed differently, the releasing A050 comprises releasing the first and second memory pages 131, 132. Following this example, action A060 may preferably be performed.

In some examples, the respective memory blade parameter may indicate power consumption of memory blades. The MMF 110 may then release those memory pages that are stored on memory blades that has a power consumption above a threshold value, or simply those who consume the most power.

Action A060

The MMF 110 may create a third memory page 133, including the identical information. In this manner, the MMF 110 avoids loss of the identical information.

A memory blade for the third memory page 133 may have been selected based on a respective memory blade parameter of the third memory page 133. The respective memory blade parameter of the third memory page 133 is typically different from the respective memory blade parameters of the first and second memory pages 131, 132.

Moreover, a respective latency parameter of the third memory page 133 is less than the respective latency parameters of the first and second memory pages 131, 132.

Action A070

Subsequent to at least action A050, the MMF 110 may update memory address translation information, managed by one or more Memory Address Translation Functions (MATF) associated with the set of computing pools 102, 103, 104, while taking the released first or second memory page 131, 132 into account.

Similarly, the MMF 110, the EMF may include the MATF (not shown), or portions thereof. In some other examples, the MATF is separate from the EMF.

Figure 3:
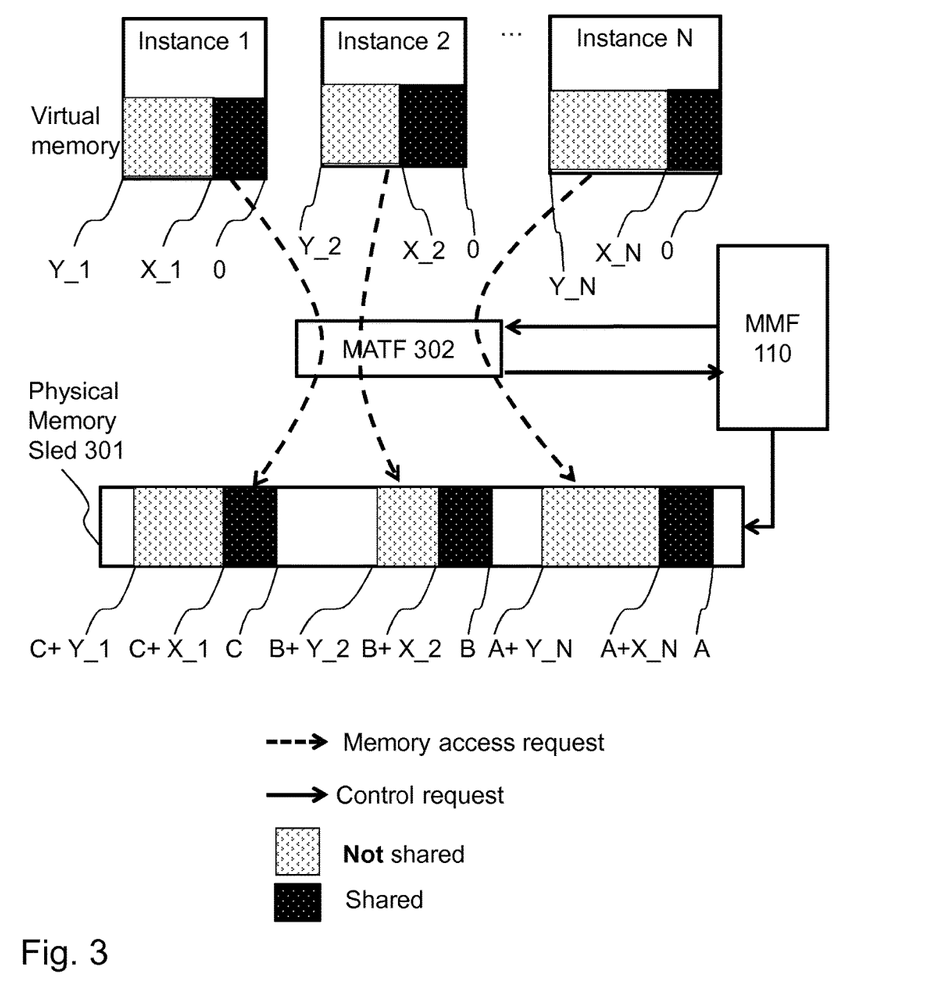
FIGS. 3 and 4 are block diagrams illustrating an embodiment herein.

FIG. 3 illustrates a portion of the exemplifying hardware system 100 of FIG. 1. The set of memory blades 105, 106, 107 are exemplified by a physical memory sled 301. A set of instances 1 . . . N are executed in a set of virtual hardware assemblies (not shown). It is only the physical memory sled 301 of the virtual hardware assemblies that is illustrated. The MMF 110 communicates (shown as solid arrows) with a MATF 302. The MATF 302 translates from virtual address space to physical address space of the physical memory sled 301. An instance 1 sends a memory access request to the MATF 302 when the instance 1 wishes to reach its memory space. As mentioned, the MATF 302 translates the virtual memory address of the instance to the actual physical address.

As an example, within a system with architecture as shown in FIG. 1, the MATF will have a table as shown in Table 1 below. When Instance 1, such as an operating system, a host, a virtual machine, an application or the like, requests access to a memory page within its virtual memory address range (i.e., $0-Y\_1$), then the MATF 302 translates the virtual address of Instance 1 to address on physical memory (i.e., $C-(C+Y\_1)$). The dark areas illustrate memory that potentially may be shared or merged, whereas the lighter areas with dots illustrate memory that cannot be shared due to differing contents.

TABLE 1

MATF memory address table:

| Instance | Virtual address space | Physical address space |
|---|---|---|
| 1 | 0-Y_1 | C-(C + Y_1) |
| 2 | 0-Y_2 | B-(B + Y_2) |
| N | 0-Y_N | A-(A + Y_N) |

Figure 4:
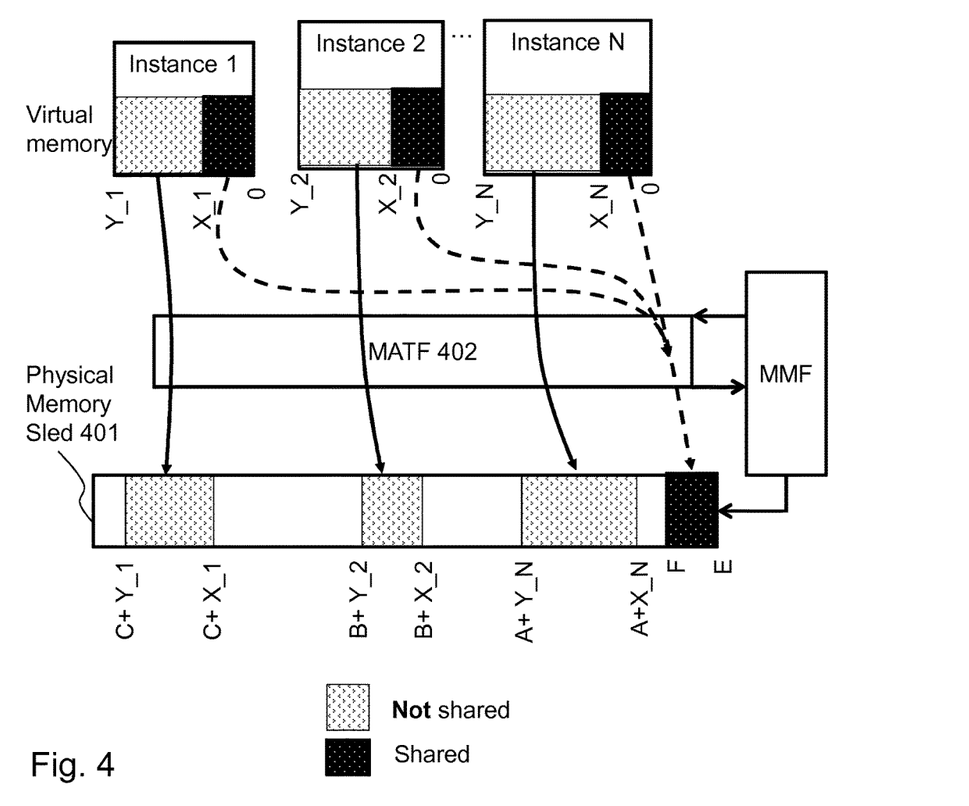

With the scenario of FIG. 3, FIG. 4 illustrates when memory merging has been applied, i.e. the MMF 110 have release one or more of the sharable, or merge-able, memory pages, which were shown as dark areas in FIG. 3.

Hence, after memory merging, or sharing, e.g. partially by action A050, and updating of the address translation table as in action A070, each instance that requests to access to the shared part of memory will be redirected to an address range of shared memory.

When Instance 1 requests to access a page within the range of 0-X_1 then the MATF 402 will translate this request to address the range of E-F. The MATF table of this example is illustrated in Table 2.

TABLE 2

| Instance (Host/VM/App) | Virtual address space | Physical address space |
|---|---|---|
| 1 | 0-X_1 | E-F |
|   | X_1-Y_1 | (C + X_1)-(C + Y_1) |
| 2 | 0-X_2 | E-F |
|   | X_2-Y_2 | (B + X_2)-(B + Y_2) |
| N | 0-X_N | E-F |
|   | X_N-Y_N | (A + X_N)-(A + Y_N) |

Note that when in shared memory space, instances only have read access, having configured the memory as Copy On Write (COW). If an instance needs to modify the shared address the MATF writes the new data in another address and copies the rest after that. Then the MATF can update the table for that particular instance.

Through statistical analysis mechanisms the MMF 110 can place the shared memory in an optimal location, e.g. as close as possible to the instances which access the memory more frequently in order to reduce network cost. Moreover when one of the instance is not using the shared memory any more, e.g., as a result of write operation, a new preferred location for the memory can be computed by MMF 110.

Figure 5:
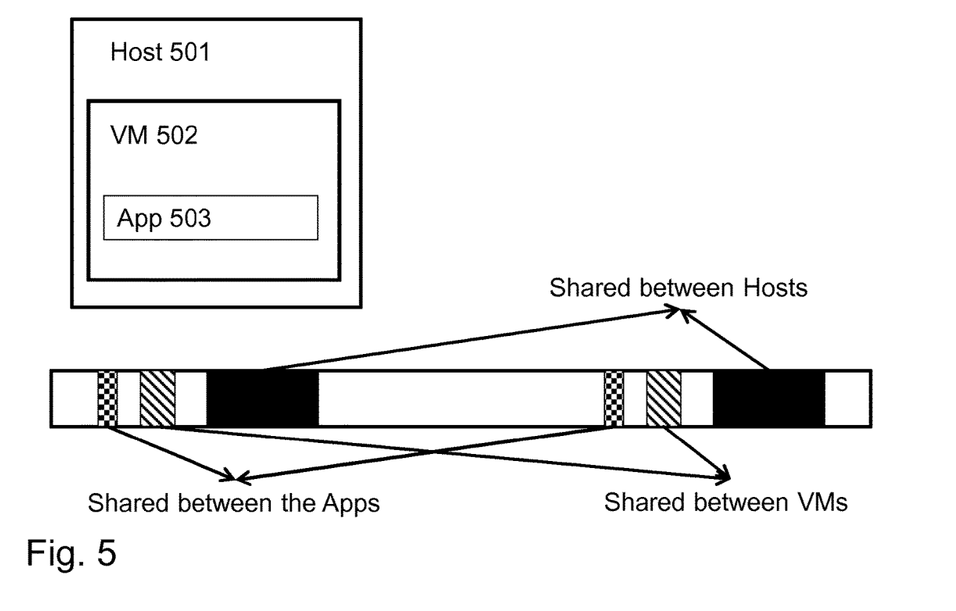
FIG. 5 is a block diagram illustrating shared memory pages.

FIG. 5 illustrates various instances, such as a host 501, a virtual machine (VM) 502, an application 503. A host 501 may typically be represented by one of the operating systems illustrated in FIG. 1. FIG. 5 illustrates that sharing, or merging, of memory may be performed for these various instances. The merging may be expressed as being performed at different levels. A checkered area illustrates sharing between applications, a striped area illustrates sharing between virtual machines, and a black solid area illustrates sharing between hosts, or operating systems.

Figure 6:
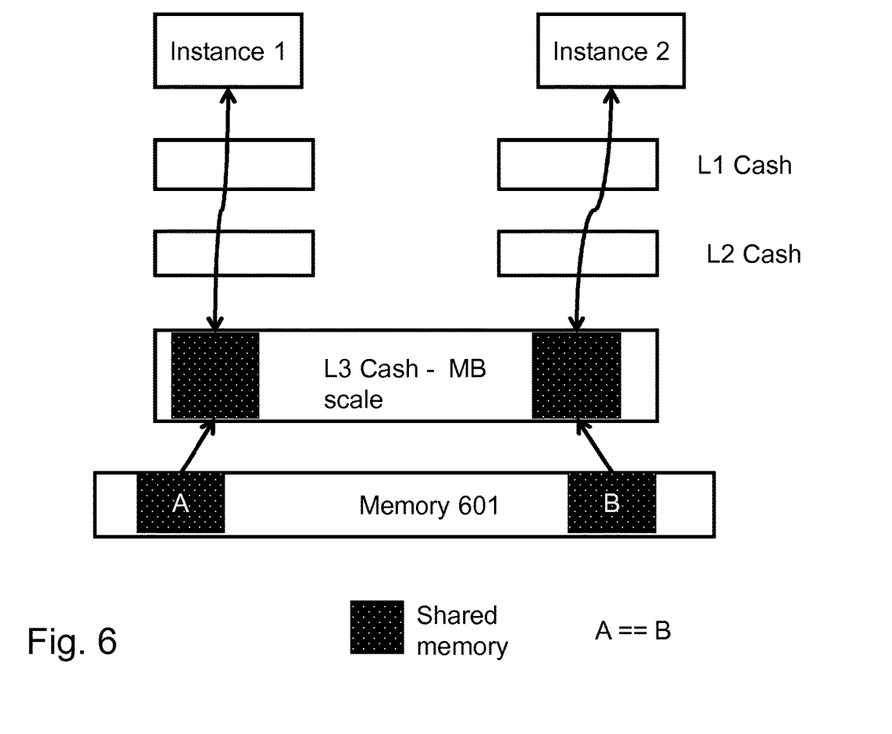
FIGS. 6 and 7 are block diagrams illustrating embodiments involving cache level merging.

In a further example, memory merging may be implemented for caches as shown in FIG. 6. In this manner, cache consumption may be reduced.

FIG. 6 depicts the system of FIG. 1 with two operating systems running on two different computing units, such as independent CPU cores. The computing units are different because there are separate L1 and L2 caches, but a L3 cache is shared, e.g. to cut some cost of memory. Memory block A and B are storing same content, i.e. identical information. According to conventional solutions, when Instance 1 and instance 2 request access to information stored in blocks A and B, then both block A and B will be loaded to L3 cache, even if they have the same content.

By using the memory merging as disclosed herein, only one of the blocks A and B will be kept in memory as a shared block (shown as dark area) between two instances.

Figure 7:
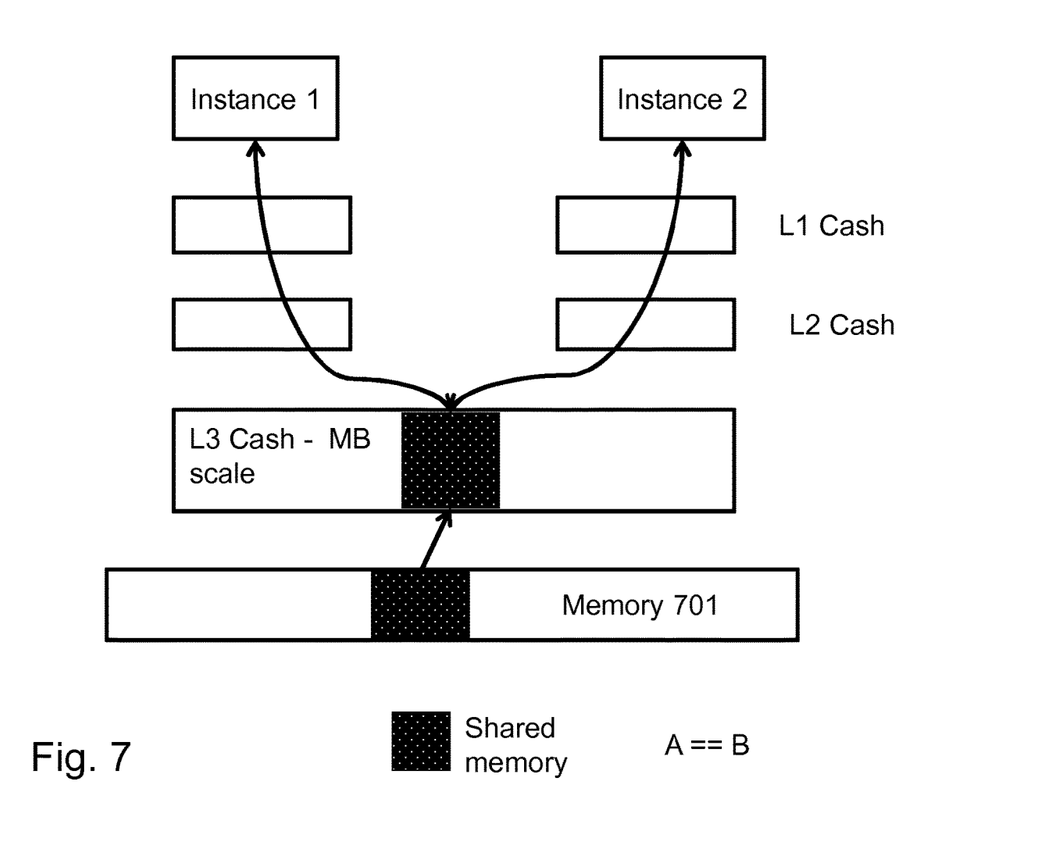

As a result, with reference to FIG. 7, when Instance 1 and instance 2 request simultaneous access to block NB, the L3 cache will be loaded only once for both instances. In this way, data transmission requirements between memory 601, 701 may be reduced. Thus, potentially avoiding congesting. Moreover, requirement on size of L3 cache may be reduced, or parts of the L3 cache may be used for other purposes.

Figure 8:
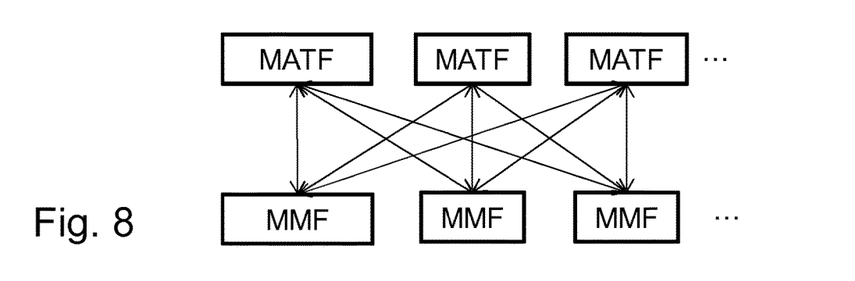
FIG. 8 is a block diagram illustrating cooperation between units disclosed herein.

FIG. 8 illustrates an example with multiple MMFs and their interworking with MATFs for different computing pools. This is to illustrate that interfaces between MMF and MATF may be known to each other. As shown in the Figure, the MATF may access multiple MMFs, which may be located at different memory blades.

Figure 9:
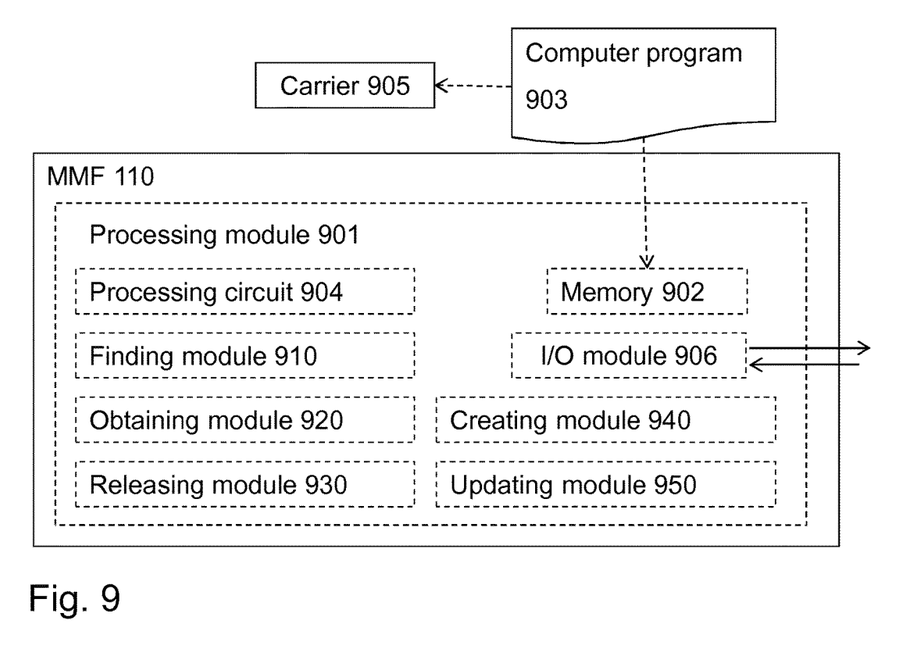
FIG. 9 is a block diagram illustrating embodiments of the Memory Merging Function.

With reference to FIG. 9, a schematic block diagram of embodiments of the Memory Merging Function 110 of FIG. 1 is shown.

The Memory Merging Function 110 may comprise a processing module 901, such as a means, one or more hardware modules and/or one or more software modules for performing the methods described herein.

The Memory Merging Function 110 may further comprise a memory 902. The memory may comprise, such as contain or store, a computer program 903.

According to some embodiments herein, the processing module 901 comprises, e.g. 'is embodied in the form of' or 'realized by', a processing circuit 904 as an exemplifying hardware module. In these embodiments, the memory 902 may comprise the computer program 903, comprising computer readable code units executable by the processing circuit 904, whereby the Memory Merging Function 110 is operative to perform the methods of FIG. 2.

In some other embodiments, the computer readable code units may cause the Memory Merging Function 110 to perform the method according to FIG. 2 when the computer readable code units are executed by the Memory Merging Function 110.

FIG. 9 further illustrates a carrier 905, or program carrier, which comprises the computer program 903 as described directly above.

In some embodiments, the processing module 901 comprises an Input/Output module 906, which may be exemplified by a receiving module and/or a sending module as described below when applicable.

In further embodiments, the processing module 901 may comprise one or more of a finding module 910, an obtaining module 920, a releasing module 930, a creating module 940, and an updating module 950 as exemplifying hardware modules. In other examples, one or more of the aforementioned exemplifying hardware modules may be implemented as one or more software modules.

Accordingly, the Memory Merging Function 110 is configured for merging memory pages 130. As explained above, the Memory Merging Function 110 may be implemented as one or more hardware modules, one or more software modules or a combination thereof. In some examples, the Memory Merging Function 110 may be a Memory Merging node.

As mentioned, the memory pages are comprised in a set of memory blades 105, 106, 107. A hardware system 100 comprises the set of memory blades 105, 106, 107 and a set of computing pools 102, 103, 104. The set of memory blades 105, 106, 107 and the set of computing pools 102, 103, 104 are interconnected with each other. The set of computing pools 102, 103, 104 comprises computing units 140. At least one instance of an operating system 120 executes on the hardware system 100. The Memory Merging Function 110 is independent of the operating system 120.

Therefore, according to the various embodiments described above, the Memory Merging Function 110 and/or the processing module 901 and/or the finding module 910 is/are configured for finding, among the memory pages, a first and a second memory page 131, 132. The first and second memory pages 131, 132 include an identical information. The first and second memory pages are associated with at least one computing unit 140 of the computing units 140.

The Memory Merging Function 110 and/or the processing module 901 and/or the obtaining module 920 is/are configured for obtaining a respective memory blade parameter relating to memory blade of the first and second memory pages 131, 132.

The Memory Merging Function 110 and/or the processing module 901 and/or the obtaining module 920, or a further obtaining module (not shown), is/are configured for obtaining a respective latency parameter relating to latency for accessing, by the at least one computing unit 140, the first and second memory pages 131, 132.

The Memory Merging Function 110 and/or the processing module 901 and/or the releasing module 930 is/are configured for releasing at least one of the first and second memory pages 131, 132 based on the respective memory blade parameter of the first and second memory pages 131, 132 and the respective latency parameter of the first and second memory pages 131, 132.

In some embodiments, the respective memory blade parameter of the first memory page 131 may be different from the respective memory blade parameter of the second memory page 132. In these embodiments, the Memory Merging Function 110 and/or the processing module 901 and/or the releasing module 930 is configured for releasing the first memory page 131, wherein the respective latency parameter of the first memory page 131 is less than the respective latency parameter of the second memory page 132.

The respective memory blade parameter of the first memory page 131 may be equal to the respective memory blade parameter of the second memory page 132. In this case, the Memory Merging Function 110 and/or the processing module 901 and/or the releasing module 930 may be configured for releasing the first and second memory pages 131, 132. Moreover, the Memory Merging Function 110 and/or the processing module 901 and/or the creating module 940 may be configured for creating a third memory page 133, including the identical information. A respective memory blade parameter of the third memory page 133 may be different from the respective memory blade parameters of the first and second memory pages 131, 132, wherein a respective latency parameter of the third memory page 133 may be less than the respective latency parameters of the first and second memory pages 131, 132.

The Memory Merging Function 110 and/or the processing module 901 and/or the obtaining module 920, or a yet further obtaining module (not shown), may be configured for obtaining a respective set of parameters relating to the first and second memory pages 131, 132. The respective set of parameters may comprise one or more of:

a respective access rate parameter relating to access rate to the first and second memory pages 131, 132 from said at least one computing unit, a respective redundancy parameter, a respective type of memory capability parameter, a respective bus-load parameter, and the like.

The Memory Merging Function 110 and/or the processing module 901 and/or the releasing module 930 may be configured for releasing said at least one of first and second memory pages 131, 132 is based on the set of parameters.

The Memory Merging Function 110 and/or the processing module 901 and/or the releasing module 930 may be configured for releasing the first memory page, wherein the respective bus-load parameter of the first memory page 131 indicates less bus-load than the respective bus-load parameter of the second memory page 132.

The Memory Merging Function 110 and/or the processing module 901 and/or the updating module 950 may be configured for updating memory address translation information, managed by one or more Memory Address Translation Functions "MATF" associated with the set of computing pools 102, 103, 104, while taking the released first or second memory page 131, 132 into account.

As mentioned, each memory blade of the set of memory blades 105, 106, 107 may comprise one or more of: a sled of memories, and a rack of memories.

Again, the set of memory blades 105, 106, 107 may comprise one or more of:

a set of primary storage pools for use by the set of computing pools, a set of cache memory blades for use by the set of computing pools, a set of storage pools, and the like.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "unit" may refer to one or more functional units, each of which may be implemented as one or more hardware modules and/or one or more software modules in a node.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a Memory Merging Function, for merging memory pages, wherein the memory pages are comprised in a set of memory blades, wherein a hardware system comprises the set of memory blades and a set of computing pools, wherein the set of memory blades and the set of computing pools are interconnected with each other, wherein the set of computing pools comprises computing units, wherein at least one instance of an operating system executes on the hardware system, wherein the Memory Merging Function is independent of the operating system, wherein the method comprises:

finding, among the memory pages, a first and a second memory page, wherein the first and second memory pages include an identical information, wherein the first and second memory pages are associated with at least one computing unit of the computing units;

obtaining a respective memory blade parameter relating to memory blade of the first and second memory pages;

obtaining a respective latency parameter relating to latency for accessing, by the at least one computing unit, the first and second memory pages; and releasing at least one of the first and second memory pages based on the respective memory blade parameter of the first and second memory pages and the respective latency parameter of the first and second memory pages.

2. The method according to claim 1, wherein the respective memory blade parameter of the first memory page is different from the respective memory blade parameter of the second memory page, wherein the releasing comprises releasing the first memory page, wherein the respective latency parameter of the first memory page is less than the respective latency parameter of the second memory page.

3. The method according to claim 1, wherein the respective memory blade parameter of the first memory page is equal to the respective memory blade parameter of the second memory page, wherein the releasing comprises releasing the first and second memory pages, wherein the method further comprises:

creating a third memory page, including the identical information, wherein a respective memory blade parameter of the third memory page is different from the respective memory blade parameters of the first and second memory pages, wherein a respective latency parameter of the third memory page is less than the respective latency parameters of the first and second memory pages.

4. The method according to claim 1, wherein the method further comprises:
obtaining a respective set of parameters relating to the first and second memory pages, wherein the respective set of parameters comprises one or more of:
a respective access rate parameter relating to access rate to the first and second memory pages from said at least one computing unit,
a respective redundancy parameter,
a respective type of memory capability parameter, and
a respective bus-load parameter,
wherein the releasing of said at least one of first and second memory page further is based on the set of parameters.

5. The method according to claim 4, wherein the releasing of said at least one of the first and second memory comprises releasing the first memory page, wherein the respective bus-load parameter of the first memory page indicates less bus-load than the respective bus-load parameter of the second memory page.

6. The method according to claim 1, wherein the method further comprises:
updating memory address translation information, managed by one or more Memory Address Translation Functions "MATF" associated with the set of computing pools, while taking the released first or second memory page into account.

7. The method according to claim 1, wherein each memory blade of the set of memory blades comprises one or more of: a sled of memories, and a rack of memories.

8. The method according to claim 1, wherein the set of memory blades comprises one or more of:
a set of primary storage pools for use by the set of computing pools,
a set of cache memory blades for use by the set of computing pools, and
a set of storage pools.

9. A Memory Merging Function for merging memory pages, wherein the memory pages are comprised in a set of memory blades, wherein a hardware system comprises the set of memory blades and a set of computing pools, wherein the set of memory blades and the set of computing pools are interconnected with each other, wherein the set of computing pools comprises computing units, wherein at least one instance of an operating system executes on the hardware system, wherein the Memory Merging Function is independent of the operating system, wherein the Memory Merging Function comprises:
a processing circuit; and
a memory containing computer readable code which, when executed by the processing circuit, instructs the Memory Merging Function to perform operations to:
find, among the memory pages, a first and a second memory page, wherein the first and second memory pages include an identical information, wherein the first and second memory pages are associated with at least one computing unit of the computing units;
obtain a respective memory blade parameter relating to memory blade of the first and second memory pages;
obtain a respective latency parameter relating to latency for accessing, by the at least one computing unit, the first and second memory pages; and
release at least one of the first and second memory pages based on the respective memory blade parameter of the first and second memory pages and the respective latency parameter of the first and second memory pages.

10. The Memory Merging Function according to claim 9, wherein the respective memory blade parameter of the first memory page is different from the respective memory blade parameter of the second memory page, wherein the computer readable code further instructs the Memory Merging Function to perform operations to release the first memory page, wherein the respective latency parameter of the first memory page is less than the respective latency parameter of the second memory page.

11. The Memory Merging Function according to claim 9, wherein the respective memory blade parameter of the first memory page is equal to the respective memory blade parameter of the second memory page, wherein the computer readable code further instructs the Memory Merging Function to perform operations to release the first and second memory pages, and wherein the Memory Merging Function to perform operations to create a third memory page, including the identical information, wherein
a respective memory blade parameter of the third memory page is different from the respective memory blade parameters of the first and second memory pages, wherein a respective latency parameter of the third memory page is less than the respective latency parameters of the first and second memory pages.

12. The Memory Merging Function according to claim 9, wherein the computer readable code further instructs the Memory Merging Function to perform operations to obtain a respective set of parameters relating to the first and second memory pages, wherein the respective set of parameters comprises one or more of:
a respective access rate parameter relating to access rate to the first and second memory pages from said at least one computing unit,
a respective redundancy parameter,
a respective type of memory capability parameter, and
a respective bus-load parameter,
wherein the Memory Merging Function is to release said at least one of first and second memory pages is based on the set of parameters.

13. The Memory Merging Function according to claim 12, wherein the computer readable code further instructs the Memory Merging Function to perform operations to release the first memory page, wherein the respective bus-load parameter of the first memory page indicates less bus-load than the respective bus-load parameter of the second memory page.

14. The Memory Merging Function according to claim 9, wherein the computer readable code further instructs the Memory Merging Function to perform operations to update memory address translation information, managed by one or more Memory Address Translation Functions "MATF" associated with the set of computing pools, while taking the released first or second memory page into account.

15. The Memory Merging Function according to claim 9, wherein each memory blade of the set of memory blades comprises one or more of: a sled of memories, and a rack of memories.

16. The Memory Merging Function according to claim 9, wherein the set of memory blades comprises one or more of:
a set of primary storage pools for use by the set of computing pools, a set of cache memory blades for use by the set of computing pools, and a set of storage pools.

17. A non-transitory computer readable storage medium containing computer readable code which, when executed on a processing circuit of a network node that has a Memory Function for merging memory pages, wherein the memory pages are comprised in a set of memory blades, wherein a hardware system comprises the set of memory blades and a set of computing pools, wherein the set of memory blades and set of computing pools are interconnected with each other, wherein the set of computing pools comprises computing units, wherein at least one instance of an operating system executes on the hardware system, wherein the Memory Merging Function is independent of the operating system, causes the network node to perform the operations comprising:

finding, among the memory pages, a first and a second memory page, wherein the first and second memory pages include an identical information, wherein the first and second memory pages are associated with at least one computing unit of the computing units;

obtaining a respective memory blade parameter relating to memory blade of the first and second memory pages;

obtaining a respective latency parameter relating to latency for accessing, by the at least one computing unit, the first and second memory pages; and releasing at least one of the first and second memory pages based on the respective memory blade parameter of the first and second memory pages and the respective latency parameter of the first and second memory pages.

18. The non-transitory computer readable storage medium according to claim 17, wherein the respective memory blade parameter of the first memory page is different from the respective memory blade parameter of the second memory page, wherein the releasing comprises releasing the first memory page, wherein the respective latency parameter of the first memory page is less than the respective latency parameter of the second memory page.

19. The non-transitory computer readable storage medium according to claim 17, wherein the respective memory blade parameter of the first memory page is equal to the respective memory blade parameter of the second memory page, wherein the releasing comprises releasing the first and second memory pages, and wherein the computer readable code which, when executed on the processing circuit, further causes the network node to perform operations comprising:

creating a third memory page, including the identical information, wherein a respective memory blade parameter of the third memory page is different from the respective memory blade parameters of the first and second memory pages, wherein a respective latency parameter of the third memory page is less than the respective latency parameters of the first and second memory pages.

20. The non-transitory computer readable storage medium according to claim 17, wherein the computer readable code which, when executed on the processing circuit, further causes the network node to perform operations comprising:

obtaining a respective set of parameters relating to the first and second memory pages, wherein the respective set of parameters comprises one or more of:

a respective access rate parameter relating to access rate to the first and second memory pages from said at least one computing unit, a respective redundancy parameter, a respective type of memory capability parameter, and a respective bus-load parameter, wherein the releasing of said at least one of first and second memory pages further is based on the set of parameters.

21. The non-transitory computer readable storage medium according to claim 20, wherein the releasing of said at least one of the first and second memory pages comprises releasing the first memory page, wherein the respective bus-load parameter of the first memory page indicates less bus-load than the respective bus-load parameter of the second memory page.

22. The non-transitory computer readable storage medium according to claim 17, wherein the computer readable code which, when executed on the processing circuit, further causes the network node to perform operations comprising:

updating memory address translation information, managed by one or more Memory Address Translation Functions "MATF" associated with the set of computing pools, while taking the released first or second memory page into account.

23. The non-transitory computer readable storage medium according to claim 17, wherein each memory blade of the set of memory blades comprises one or more of: a sled of memories, and a rack of memories.

24. The non-transitory computer readable storage medium according to claim 17, wherein the set of memory blades comprises one or more of:

a set of primary storage pools for use by the set of computing pools, a set of cache memory blades for use by the set of computing pools, and a set of storage pools.

* * * * *